US006868489B2

United States Patent
Luick

(10) Patent No.: US 6,868,489 B2
(45) Date of Patent: Mar. 15, 2005

(54) CARRY GENERATION IN ADDRESS CALCULATION

(75) Inventor: David Arnold Luick, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 497 days.

(21) Appl. No.: 10/038,958

(22) Filed: Jan. 2, 2002

(65) Prior Publication Data

US 2003/0126401 A1 Jul. 3, 2003

(51) Int. Cl.[7] .............................................. G06F 12/00
(52) U.S. Cl. ..................................... 711/220; 708/710
(58) Field of Search .............................. 708/710, 709, 708/708; 711/219, 220

(56) References Cited

U.S. PATENT DOCUMENTS

| | | | | |
|---|---|---|---|---|
| 3,993,891 A | * | 11/1976 | Beck et al. ................. | 708/710 |
| 4,218,747 A | * | 8/1980 | Miura ......................... | 708/234 |
| 4,584,661 A | * | 4/1986 | Grundland .................. | 708/712 |
| 5,047,974 A | * | 9/1991 | Young ......................... | 708/712 |
| 5,122,982 A | * | 6/1992 | Cohn ........................... | 708/710 |
| 5,278,783 A | * | 1/1994 | Edmondson ................ | 708/711 |
| 5,964,827 A | * | 10/1999 | Ngo et al. ................... | 708/710 |
| 2003/0115237 A1 | * | 6/2003 | Fletcher ...................... | 708/711 |

* cited by examiner

Primary Examiner—Jack A. Lane
(74) Attorney, Agent, or Firm—Moser, Patterson & Sheridan LLP

(57) ABSTRACT

Embodiments are provided in which the generation of a carry of a sum of two numbers can be implemented by adding only some most significant bits of the two numbers and assuming that the sum of the remaining bits do not generate a carry. Other embodiments are also provided in which the generation of the carry of a sum of the two numbers can be implemented using carry look-ahead techniques wherein generate and propagate terms are generated. By combining the product terms of the carry function and combining pairs of propagate or generate terms, the generation of the carry of the sum of the two numbers can be implemented in an And-Or-Inverter function less complex than that of prior art. Still other embodiments are provided in which one operand of a carry generation circuit comes from a fixed source and the other operand is selected from several forwarding sources. As a result, the selection of the operands and the generation of the propagate and generate terms for generating the carry can be implemented in a single complex domino level of logic which includes a sum of product followed by a simple two-way gate.

18 Claims, 5 Drawing Sheets

CARRY GENERATION IN ADDRESS CALCULATION

BACKGROUND OF THE INVENTION

1. Field of the Invention

The present invention generally relates to carry generation, and more particularly to carry generation in address calculation in a computer system.

2. Description of the Related Art

In a typical computer system, most addressing modes require an addition of two numbers to calculate a storage address. In one addressing mode, the two numbers can be in a base register and an index register. In another addressing mode, one of the two numbers can be in a base register, and the other number can be in the instruction being executed.

These addressing modes are used in accessing data cache in which storage blocks in an array of storage blocks are arranged in rows and columns. In order to speed up a data cache access, some N least significant bits of the two numbers are added in three addition portions. In the first addition portion, some most significant bits of the N bits of the first number are added to the corresponding bits of the second number. The result is used to select a row of storage blocks. The first addition portion is well known in prior art as Row Access Select (RAS). In the second addition portion, some next most significant bits of the N bits of the first number are added to the corresponding bits of the second number. The result is used to select a column of the storage blocks. The second addition portion is well known in prior art as Column Access Select (CAS). The combined effect of the first and second addition portions is a selection of a storage block in the array of storage blocks. In the third addition portion, the remaining bits of the N bits of the first number are added to the corresponding bits of the second number. The result is used to select a line of the selected storage block. The third addition portion is well known in prior art as Line Access Select (LAS).

A performance limitation arises with the foregoing addressing mode because the first and second addition portions of the addition of the two numbers do not take into account the carry from the third addition portion. Therefore, two paths corresponding to the carry being "0" and "1" must be taken by the first and second addition portions. As a result, two storage blocks are selected instead of one. When the carry is available after the third addition portion, it is determined which path is correct and which of the two storage blocks is correct. The result from the third addition portion is then used to select one line from the correct storage block. Therefore, there is a need to perform the third addition portion fast so that the carry is available as soon as possible.

Typically, in order to add two N-bit numbers, one half-adder and N−1 full-adders are used. These N adders combine to form a ripple-carry adder because the carry ripples through the N stages of the adder starting at the least significant bit to the most significant bit. The time needed for this carry propagation is in proportion to the number of bits N. The sum output of the ripple-carry adder is correct only after the carry appears at the most significant bit. The larger the number of bits N is, the slower the ripple-carry adder will be.

One technique to speed up the addition of two N-bit numbers is called carry look-ahead, and the adder using the technique is called a carry look-ahead adder. The carry look-ahead adder is faster than the ripple carry adder because the time needed to calculate the carry is independent of the number of bits N and is equal to the delay of several intermediate stages. The delay along these intermediate stages is also independent of the number of bits N. However, the implementation of these stages in prior art requires an implementation of an N×N And-Or-Inverter (AOI) function. If N is large, the implementation of the N×N AOI function becomes complex resulting in delay in the generation of the carry. Therefore, there is a need for an apparatus and method for generating the carry as fast as possible so that the correct path (with carry or without carry) can be determined as fast as possible.

Moreover, if result forwarding or bypass is implemented in the system, another logic level is required to implement the selection of different sources for the operand inputs of a carry generation circuit. Result forwarding or bypass is a technique of applying the result from a functional unit in a previous cycle to an address generator without first saving the result to a register file. Therefore, there is a need for an apparatus and method for reducing the number of logic levels in implementing the selection of different sources for the operand inputs of the carry generation circuit and for generating the carry.

SUMMARY OF THE INVENTION

In one embodiment, a carry is generated for a sum of a first and second numbers by generating generate terms and propagate terms from the first and second numbers, generating combined terms; and generating the carry from the generate terms, the propagate terms, and the combined terms.

In another embodiment, a carry is generated using a carry generation circuit. The carry generation circuit comprises a plurality of inputs configured to receive the first and second numbers and a generate and propagate term generation circuit coupled to the inputs. The generate and propagate term generation circuit is configured to (a) generate propagate terms, generate terms, combined generate terms, and combined propagate terms from the first and second numbers, and (b) generate the carry from the propagate terms, the generate terms, the combined generate terms, and the combined propagate terms.

In still another embodiment, the generation of a propagate term from a first and second bits of the first and second numbers, respectively, comprises providing at least a first and second gates having a dotted output, and passing the first and second operand bits through the first and second gates, respectively, to the dotted output so as to generate the first propagate term at the dotted output.

In still another embodiment, a propagate term generation circuit is used for generating a propagate term from a first and second operand bits. The propagate term generation circuit comprises at least a first and second gates having a dotted output wherein the first and second gates are configured to receive the first and second operand bits, respectively, and generate the first propagate term at the dotted output.

In still another embodiment, the generation of a generate term from a first and second bits of the first and second numbers, respectively, comprises providing N−1 combining gates having a dotted output, applying the first bit to all the N−1 combining gates and applying the remaining N−1 bits including the second bit to the N−1 combining gates one-for-one, and passing the first bit and the second bit through a first combining gate of the N−1 combining gates to the dotted output so as to generate the first generate term at the dotted output.

In still another embodiment, a generate term generation circuit is used for generating a generate term from a first and second operand bits of a plurality of N bits. The generate term generation circuit comprises N−1 combining gates having a dotted output, the N−1 combining gates being configured to receive the first bit as their first inputs, and receive one-for-one the remaining N−1 bits including the second bit as their second inputs; wherein a first combining gate of the N−1 combining gates combines the first and second bits to generate the first generate term.

In still another embodiment, a carry of a sum of a first and second N-bit numbers is generated by adding, with an adder, M most significant bits of the first and second numbers to generate the carry, M being at least one but less than N.

In still another embodiment, a carry generation circuit is used for generating a carry of a sum of a first and second N-bit numbers. The carry generation circuit comprises an addition circuit configured to receive M most significant bits of the first and second numbers and add the M most significant bits of the first and second numbers to generate the carry, M being at least one but less than N.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments are provided in which the generation of a carry of a sum of two numbers can be implemented by adding only some most significant bits of the two numbers and assuming that the sum of the remaining bits do not generate a carry. Other embodiments are also provided in which the generation of the carry of a sum of the two numbers can be implemented using carry look-ahead techniques wherein generate and propagate terms are generated. By combining the product terms of the carry function and combining pairs of propagate or generate terms, the generation of the carry of the sum of the two numbers can be implemented in an And-Or-Inverter function less complex than that of prior art. Still other embodiments are provided in which one operand of a carry generation circuit comes from a fixed source and the other operand is selected from several forwarding sources. As a result, the selection of the operands and the generation of the propagate and generate terms for generating the carry can be implemented in a single complex domino level of logic which includes a sum of product followed by a simple two-way gate.

Figure 1:
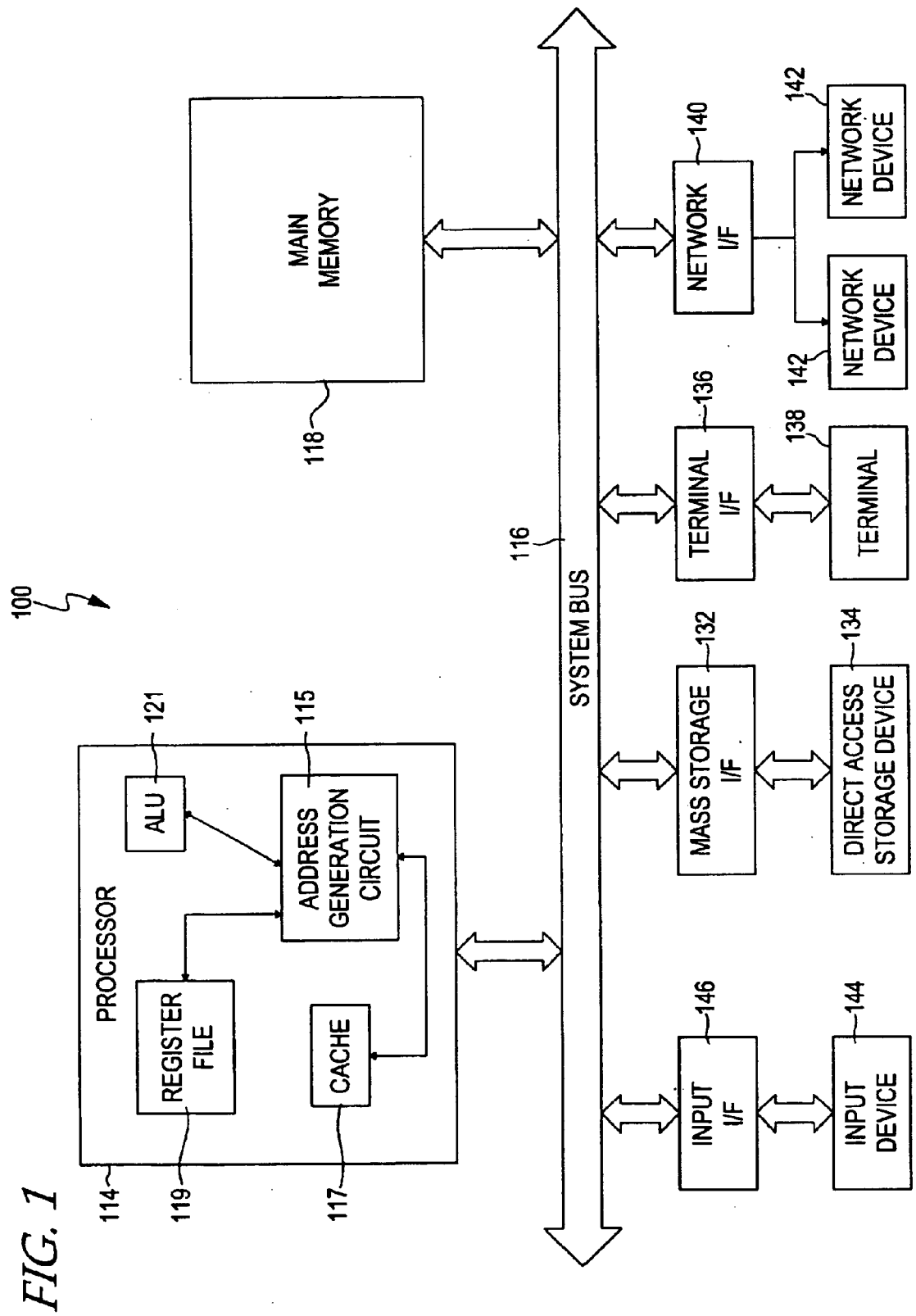
FIG. 1 is a computer system 100 according to an embodiment.

FIG. 1 shows a computer system 100 according to an embodiment. Illustratively, the computer system 100 includes a system bus 116, at least one processor 114 coupled to the system bus 116. The processor 114 includes an Address Generation circuit 115, a cache 117 coupled to the Address Generation circuit 115, a Register File 119 coupled to the Address Generation circuit 115, and an ALU (Arithmetic Logic Unit) 121 coupled to the Address Generation circuit 115. The computer system 100 also includes an input device 144 coupled to system bus 116 via an input interface 146, a storage device 134 coupled to system bus 116 via a mass storage interface 132, a terminal 138 coupled to system bus 116 via a terminal interface 136, and a plurality of networked devices 142 coupled to system bus 116 via a network interface 140.

Terminal 138 is any display device such as a cathode ray tube (CRT) or a plasma screen. Terminal 138 and networked devices 142 are desktop or PC-based computers, workstations, network terminals, or other networked computer systems. Input device 144 can be any device to give input to the computer system 100. For example, a keyboard, keypad, light pen, touch screen, button, mouse, track ball, or speech recognition unit could be used. Further, although shown separately from the input device, the terminal 138 and input device 144 could be combined. For example, a display screen with an integrated touch screen, a display with an integrated keyboard or a speech recognition unit combined with a text speech converter could be used.

Storage device 134 is DASD (Direct Access Storage Device), although it could be any other storage such as floppy disc drives or optical storage. Although storage 134 is shown as a single unit, it could be any combination of fixed and/or removable storage devices, such as fixed disc drives, floppy disc drives, tape drives, removable memory cards, or optical storage. Main memory 118 and storage device 134 could be part of one virtual address space spanning multiple primary and secondary storage devices.

The contents of main memory 118 can be loaded from and stored to the storage device 134 as processor 114 has a need for it. Main memory 118 is any memory device sufficiently large to hold the necessary programming and data structures of the invention. The main memory 118 could be one or a combination of memory devices, including random access memory (RAM), non-volatile or backup memory such as programmable or flash memory or read-only memory (ROM). The main memory 118 may be physically located in another part of the computer system 100. While main memory 118 is shown as a single entity, it should be understood that memory 118 may in fact comprise a plurality of modules, and that main memory 118 may exist at multiple levels, from high-speed registers and caches to lower speed but larger DRAM chips.

Figure 2:
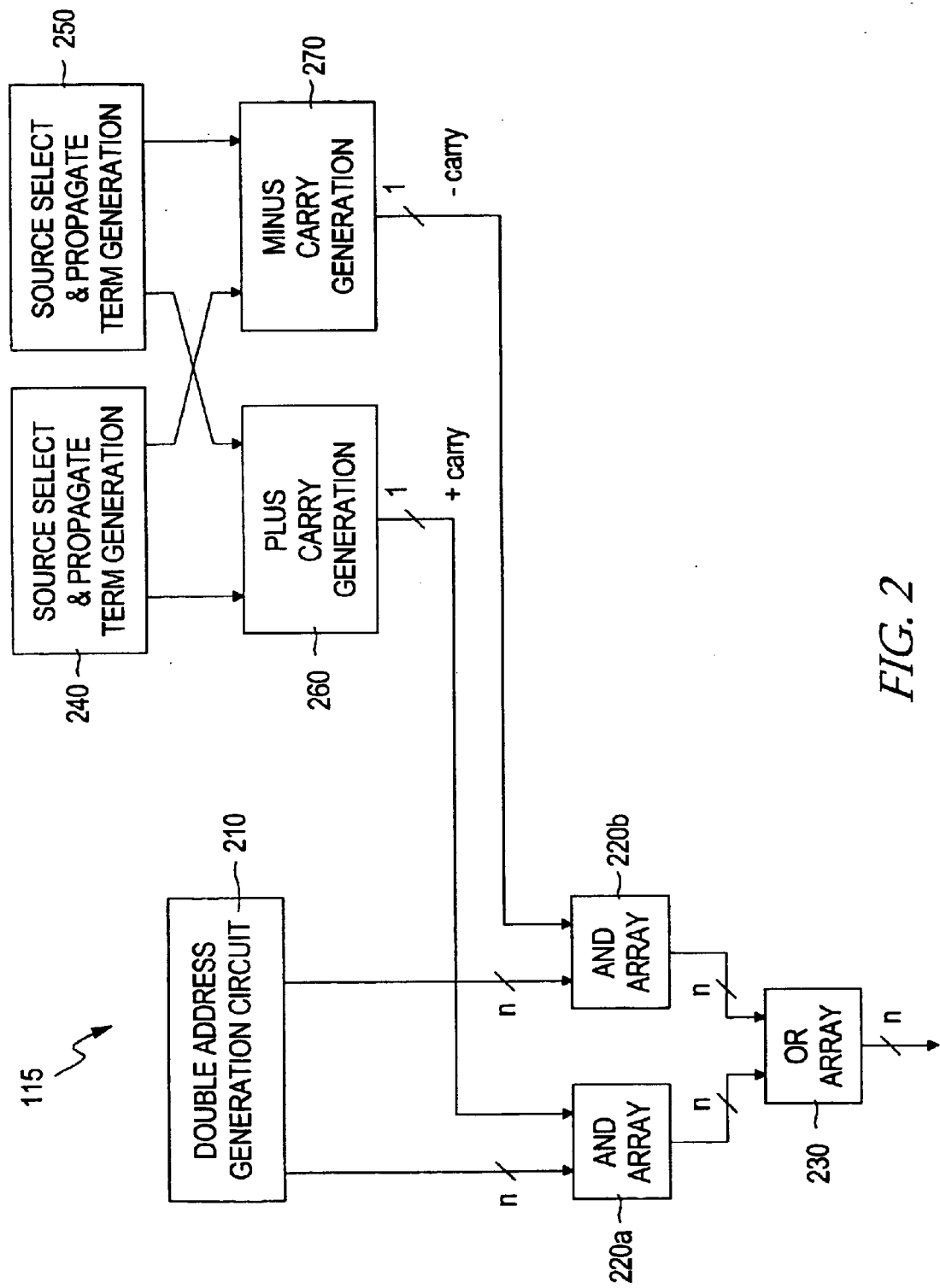
FIG. 2 shows one embodiment of the Address Generation circuit 115 of FIG. 1.

FIG. 2 shows one embodiment of the Address Generation circuit 115 of FIG. 1. The Address Generation circuit 115 includes a Double Address Generation circuit 210, which generates a with-carry address and a no-carry address. The with-carry address is used to select a first storage block and then a first cache line therein in the cache 117 (FIG. 1) with an assumption that there is a carry from the generation of a line access select address. The no-carry address is used to select a second storage block and then a second cache line therein in the cache 117 (FIG. 1) with an assumption that there is no carry from the generation of the line access select address. The Address Generation circuit 115 also includes two AND Arrays 220a & 220b that pass the with-carry and no-carry addresses, respectively, from the Double Address Generation circuit 210 to an OR Array 230. The OR Array 230 passes one of the with-carry and no-carry addresses to the cache 117 (FIG. 1). The passed address selects either the first or second cache line.

More specifically, only one of the with-carry and no-carry addresses is passed unchanged to the OR Array 230. If there is a carry from the generation of the line access select address (i.e., the plus carry is 1), only the with-carry address is passed unchanged by the AND Array 220a to the OR Array 230. The minus carry being 0 causes the AND Array 220b to generate all zeros to the OR Array 230. As a result, the OR Array 230 outputs the with-carry address to the cache 117 (FIG. 1). The with-carry address selects the first cache line in the first storage block.

Similarly, if there is no carry from the generation of the line access select address (the minus carry is 1), only the no-carry address is passed unchanged by the AND Array 220b to the OR Array 230. The plus carry being 0 causes the AND Array 220a to generate all zeros to the OR Array 230. As a result, the OR Array 230 outputs the no-carry address to the cache 117 (FIG. 1). The no-carry address selects the second storage block and the no-carry address selects the second cache line in the second storage block.

The Address Generation circuit 115 also includes a Source Select & Propagate Term Generation circuit 240, a Source Select & Generate Term Generation circuit 250, a Plus Carry Generation circuit 260, and a Minus Carry Generation circuit 270.

The Source Select & Propagate Term Generation circuit 240 and the Source Select & Generate Term Generation circuit 250 select two operands from a plurality of operand sources and generate a plurality of propagate terms and generate terms, respectively, to the Plus Carry Generation circuit 260 and the Minus Carry Generation circuit 270.

The Plus Carry Generation circuit 260 and the Minus Carry Generation circuit 270 generate the plus carry and the minus carry to the AND Arrays 220a & 220b, respectively. The plus carry and the minus carry are opposite signals. That is, if one is logic 1, the other is logic 0.

In one embodiment, assuming the with-carry address has N bits, the AND Array 220a can be implemented as N two-input AND gates. The first inputs of these N AND gates are the N bits of the with-carry address. The second inputs of the N AND gates receive the plus carry. As a result, when the plus carry is 1, the with-carry address is passed through the AND Array 220a. When the plus carry is 0, the AND Array 220a generates all zeros to the OR Array 230. The AND Array 220b is implemented in a similar manner.

In one embodiment, the OR Array 230 is implemented as N two-input OR gates. The N first inputs of the N OR gates come from the AND Array 220a. The N second inputs of the N OR gates come from the AND Array 220b.

Assuming the line access select address has 9 bits, the task performed by the Source Select & Propagate Term Generation circuit 240, the Source Select & Generate Term Generation circuit 250, the Plus Carry Generation circuit 260, and the Minus Carry Generation circuit 270 is to receive 9 least significant bits from different operand sources, select two 9-bit operands from two operand sources, generate propagate terms and generate terms from these two 9-bit operands, and generate the plus carry and minus carry from these propagate and generate terms as fast as possible. In short, the task performed by these four circuits 240, 250, 260, and 270 is to select a first and second 9-bit operand from different sources and generate the plus carry and minus carry of a sum of the first and second 9-bit operands to the AND Arrays 220a & 220b, respectively.

In one embodiment, not all 9 bits of the first and second operands are used. More specifically, the two least significant bits of the 9 bits of the first and second operands are ignored. Assume that the bits of the first operand are A0, A1, . . . , A8, wherein bit A0 is the most significant bit, and bit A8 is the least significant bit. Similarly, assume that the bits of the second operand are B0, B1, . . . , B8, wherein bit B0 is the most significant bit, and bit B8 is the least significant bit. Using the formula for calculating a carry of a carry-look-ahead adder: $C_i = G_i + P_i * C_{i+1}$, where $C_i$ is a carry at bit i, generate term $G_i = A_i * B_i$, and propagate term $P_i = A_i + B_i$, the plus carry of FIG. 2 is: C0=G0+P0*C1=G0+P0*(G1+P1*C2)=G0+P0*G1+P0*P1*C2=G0+P0*G1+P0*P1*(G2+P2*C3)=G0+P0*G1+P0*P1*G2+P0*P1*P2*C3= . . . =G0+P0*G1+P0*P1*G2+P0*P1*P2*G3+P0*P1*P2*P3*G4+P0*P1*P2*P3*P4*G5+P0*P1*P2*P3*P4*P5*G6+P0*P1*P2*P3*P4*P5*P6*C7.

Assuming C7 is zero, C0=G0+P0*G1+P0*P1*G2+
P0*P1*P2*G3+P0*P1*P2*P3*G4+P0*P1*P2*P3*P4*
G5+P0*P1*P2*P3*P4*P5*G6.  (Equation 1).

In Equation 1, the propagate terms P7 and P8, and the generate terms G7 and G8 are not present, as a result, the bits A7, A8, B7, and B8 are not needed and therefore ignored. As a result, the Source Select & Propagate Term Generation circuit 240 and the Source Select & Generate Term Generation circuit 250 do not receive the two least significant bits from different operand sources.

The assumption that C7 is zero is a good assumption if most load instructions in the computer system 100 use a base register whose content is at least word (4 bytes) aligned. In other words, the two least significant bits of the first operand (i.e., A7 and A8) are usually all 0. This makes C7 equal 0 regardless of the second operand. As a result, Equation 1 above is applicable. Even when a load instruction uses a base register whose content is not word aligned (i.e., the two least significant bits of the first operand are not both zero), there is still a substantial chance of C7 being 0, and the assumption is correct.

The implementation of Equation 1 requires the implementation of only a 7×7 AOI function because the right hand side of Equation 1 has seven product terms each of which has no more than seven variables. Without the assumption that C7 is 0b, the formula for calculating C0 would be:

C0=G0+P0*G1+P0*P1*G2+P0*P1*P2*G3+P0*P1*

P2*P3*G4+P0*P1*P2*P3*P4*G5+P0*P1*P2*P3*P4*P5*

G6+P0*P1*P2*P3*P4*P5*P6*G7+P0*P1*P2*P3*P4*P5*

P6*P7*G8+P0*P1*P2*P3*P4*P5*P6*P7*P8*C9   (Equation 2), where C9 is the carry input of the addition of the first and second operands. Because C9 is zero, the last product term of the right hand side of Equation 2 can be eliminated leaving nine product terms each of which has up to nine variables. In other words, without the assumption that C7 is 0, the generation of C0 would have required the implementation of a 9×9 AOI function.

In one embodiment, the generation of C0 can be further simplified by simplifying Equation 1 above. It can be proved that $G_i = G_i * P_i$, (Equation 3). If Gi=1, then Ai=Bi=1 and therefore Pi=1. As a result, both sides of Equation 3 are equal. If Gi=0, then both sides of Equation 3 are equal, regardless the value of Pi. In other words, Equation 3 is always correct. Applying Equation 3 to the terms G0, P0*P1*G2 and P0*P1*P2*P3*G4 on the right hand side of Equation 1, Equation 1 becomes:

$$C0 = G0*P0 + P0*G1 + P0*P1*P2*G2 + P0*P1*P2*G3 + \\ P0*P1*P2*P3*P4*G4 + P0*P1*P2*P3*P4*G5 + \\ P0*P1*P2*P3*P4*P5*G6 = \\ = P0*(G0+G1) + P0*P1*P2*(G2+G3) + \\ P0*P1*P2*P3*P4*(G4+G5) + \\ P0*P1*P2*P3*P4*P5*G6$$

(Equation 4A)

Letting G01=G0+G1, G23=G2+G3, and G45=G4+G5, Equation 4 becomes:

$$C0=P0*G01+P0*P1*P2*G23+P0*P1*P2*P3*P4*G45+ \\ P0*P1*P2*P3*P4*P5*G6 \quad \text{(Equation 4B)}.$$

Letting P01=P0*P1, P23=P2*P3, and P45=P4*P5, Equation 4B becomes:

$$C0=P0*G01+P01*P2*G23+P01*P23*P4*G45+ \\ P01*P23*P45*G6 \quad \text{(Equation 5)}.$$

The right hand side of Equation 5 has four product terms each of which has no more than four variables. Therefore, C0 can be generated by implementing, with the Plus Carry Generation circuit 260, only a 4×4 AOI function which is similar in delay to a 2×8 AOI function in dynamic Silicon On Insulator (SOI) CMOS technology. In SOI CMOS technology, the generation of combined generate terms G01, G23, and G45, and combined propagate terms P01, P23, and P45 in Equation 5 requires minimal extra fan-in delay. If Equation 4B is implemented, only the combined generate terms G01, G23, and G45 are needed, and no combined propagate terms are needed.

Figure 3:
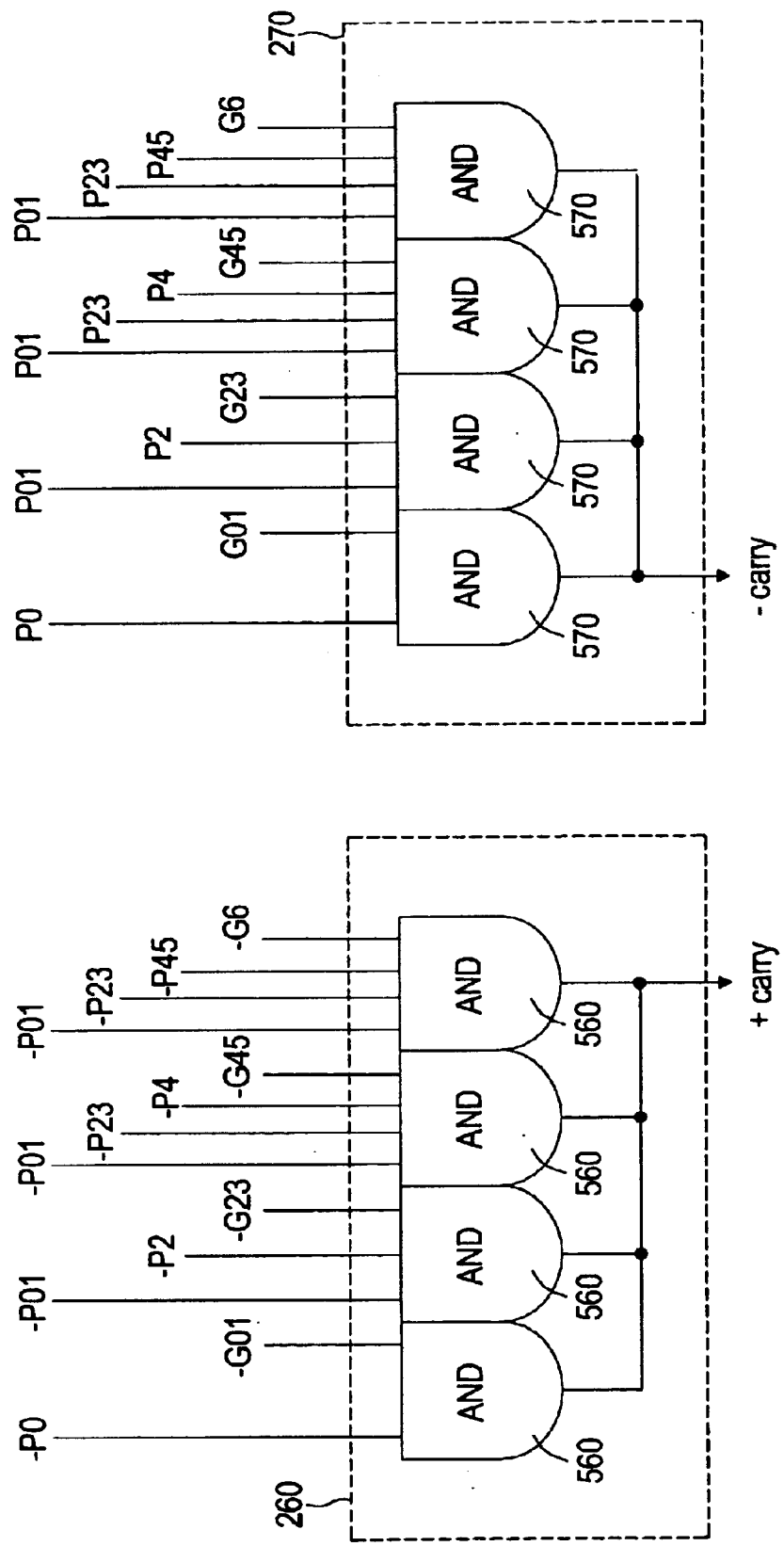
FIG. 3 shows one embodiment of the Plus Carry Generation circuit 260 and the Minus Carry Generation circuit 270 of FIG. 2.

FIG. 3 shows the implementation of the Plus Carry Generation circuit 260 and the Minus Carry Generation circuit 270 of FIG. 2 according to Equation 5 above, in an embodiment. The implementation of the Plus Carry Generation circuit 260 is similar to that of the Minus Carry Generation circuit 270. More specifically, the implementation of the Plus Carry Generation circuit 260 and the Minus Carry Generation circuit 270 uses identical circuits except that the inputs of the Plus Carry Generation circuit 260 and the Minus Carry Generation circuit 270 are complements of each other. In FIG. 3, the Minus Carry Generation circuit 270 includes four AND gates 570 dotted together (i.e., outputs being tied together to form a dotted output) to implement a sum of four product terms (Equation 5). Because the dotted output of the four dotted AND gates 570 is active-zero, the signal at the output of the Minus Carry Generation circuit 270 is Minus Carry (−Carry), not the Plus Carry (+Carry).

Similarly, the Plus Carry Generation circuit 260 includes four AND gates 560 dotted together to implement a sum of four product terms (Equation 5). However, the inputs of the Plus Carry Generation circuit 260 are complements of those of the Minus Carry Generation circuit 270. As a result, the signal at the dotted output of the Plus Carry Generation circuit 260 is Plus Carry (+Carry).

Equation 5 shows that the generation of the plus carry C0 requires only some of the propagate and generate terms. For instance, P1 is not needed. Therefore, in an embodiment, the Source Select & Propagate Term Generation circuit 240 and Source Select & Generate Term Generation circuit 250 in FIG. 2 are implemented to generate only the propagate and generate terms in Equation 5.

Figure 4:
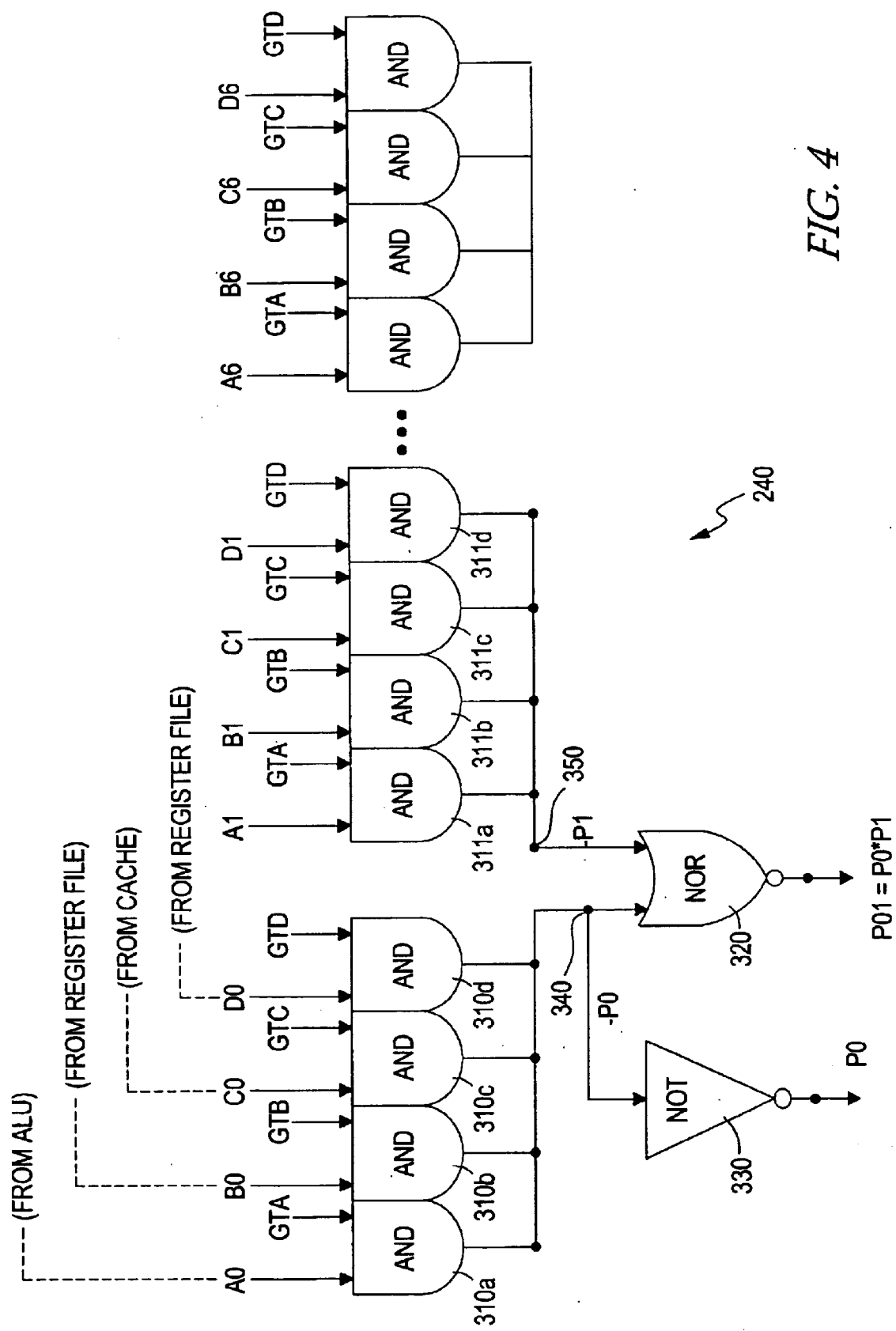
FIG. 4 shows one embodiment of the Source Select & Propagate Term Generation circuit 240 of FIG. 2.
Figure 5:
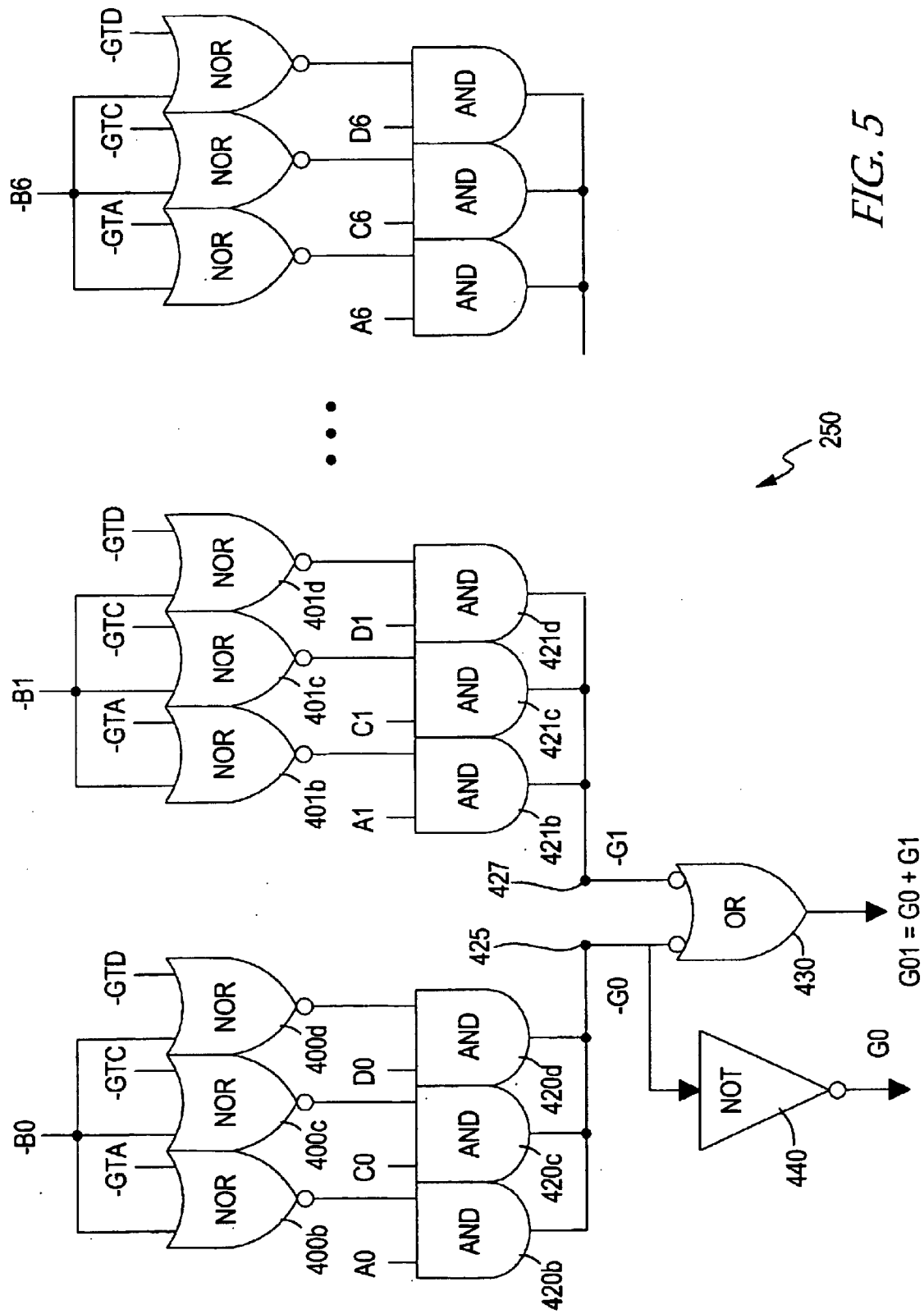
FIG. 5 shows one embodiment of the Source Select & Generate Term Generation circuit 250 of FIG. 2.

FIG. 3 shows that the use of combined generate terms G01, G23, and G45 and combined propagate terms P01, P23, and P45 helps reduce the implementation of the plus carry down to that of a 4×4 AOI function (Equation 5), instead of a 7×7 AOI function (Equation 1). FIGS. 4 & 5 show how only one complex domino logic level can be used to (a) select the first and second operands from, illustratively, four different forwarding operand sources and (b) generate all the propagate and generate terms, including the combined generate and propagate terms, present in Equation 5.

FIG. 4 shows one embodiment of the Source Select & Propagate Term Generation circuit 240 of FIG. 2. The Source Select & Propagate Term Generation circuit 240 includes 7 groups of AND gates. Each group has four AND gates dotted together to implement a sum of product function. Only 7 groups of AND gates instead of 9 are used in the Source Select & Propagate Term Generation circuit 240 because only seven most significant bits of the first and second operands are needed and used to generate the propagate terms and the generate terms present in Equation 5 as discussed above.

The first group, group 0, includes four two-input AND gates 310a, 310b, 310c, and 310d. The outputs of the AND gates 310a, 310b, 310c, and 310d are dotted together. The AND gate 310a receives as its first input a bit A0 of a signal A from the ALU 121 (FIG. 1). It is assumed that A0 is the most significant bit of signal A. The AND gate 310a receives as its second input a control signal GTA. The AND gate 310b receives as its first input a bit B0 of a signal B from the register file 119 (FIG. 1). It is assumed that B0 is the most significant bit of signal B. The AND gate 310b receives as its second input a control signal GTB. The AND gate 310c receives as its first input a bit C0 of a signal C from the cache 117 (FIG. 1). It is assumed that C0 is the most significant bit of signal C. The AND gate 310c receives as its second input a control signal GTC. The AND gate 310d receives as its first input a bit D0 of a signal D from the register file 119 (FIG. 1). It is assumed that D0 is the most significant bit of signal D. The AND gate 310d receives as its second input a control signal GTD.

The second group, group 1, includes four AND gates 311a, 311b, 311c, and 311d. The AND gates 311a, 311b, 311c, and 311d are implemented in the same manner as the AND gates 310a, 310b, 310c, and 310d. The dotted outputs of groups 0 & 1 are applied to a NOR gate 320. The output of group 0 is applied to an inverter 330. Groups 2–6 are implemented in the same manner as groups 0 & 1. The signals A, B, C, and D are forwarding or bypass signals because they come directly from a functional unit.

In an embodiment, whenever an address is to be generated, meaning there is an addition of the first and second operands, the first operand is always the signal B coming from the register file 119 (FIG. 1). The second operand can be one of the three remaining signals A, C, and D, coming from the ALU 121, the cache 117, and the register file 119 (FIG. 1). Assuming the second operand is the signal A, coming from the ALU 121 (FIG. 1). As a result, the control signals GTA and GTB are raised to 1 allowing the signal A and B, respectively, to pass through the groups of AND gates.

The control signals GTC and GTD are kept at 0 to deselect the signals C and D, respectively. In other words, bit C0 of the signal C is not allowed to pass the AND gate 310c, and bit C1 of the signal C is not allowed to pass the AND gate 311c, and so on. Similarly, bit D0 of the signal D is not allowed to pass the AND gate 310d, and bit D1 of the signal D is not allowed to pass the AND gate 311d, and so on.

The control signals GTA and GTB becoming 1 allows the bits A0 and B0, to pass through the AND gates 310a & 310b, respectively. Similarly, the control signals GTA and GTB becoming 1 also allows the bits A1 and B1, to pass through the AND gates 311a & 311b, respectively, and so on for the remaining bits of the signals A and B.

Because the outputs of the AND gates 310a & 310b are dotted together, node 340 is active zero and holds the signal −(A0+B0), wherein "−" indicates logical complement, and "+" indicates logical OR. Because P0=(A0+B0), node 340 holds the signal −P0. As a result, the output of the inverter 330 holds the signal P0 (a propagate term).

Similarly, because the outputs of the AND gates 311a & 311b are dotted together, node 350 is active zero and holds the signal −(A1+B1). Because P1=(A1+B1), node 350 holds the signal −P1. As a result, the output of the NOR gate 320 holds the signal −[(−P0)+(−P1)]=P0*P1, wherein "*" indicates logical AND operation. Because P01=P0*P1, node 350 holds the signal P01 (a combined propagate term).

In a similar manner, the signals P1, P2, P3, P4, P5, and P6 (propagate terms) are generated. For simplicity, only the generation of the signal P0 is shown and described. Also, the signals P23 and P45 (combined propagate terms) are generated, where Pij is defined as Pi*Pj. For simplicity, only the generation of signal P01 is shown and described. As a result, all the propagate terms, including combined propagate terms of Equation 5, are available at the outputs of the Source Select & Propagate Term Generation circuit 240.

Some propagate terms, such as P1 and P6, are not needed. Therefore, in one embodiment, only the propagate terms present in Equation 5 are generated so as to simplify the circuitry of the Source Select & Propagate Term Generation circuit 240.

FIG. 5 shows the Source Select & Generate Term Generation circuit 250 of FIG. 2 in details, according to an embodiment. The Source Select & Generate Term Generation circuit 250 includes 7 groups of AND and NOR gates. Each group has three NOR gates and three AND gates dotted together to implement a sum of product function.

The first group, group 0, includes three two-input AND gates 420b, 420c, and 420d. The outputs of the AND gates 420b, 420c, and 420d are dotted together. The AND gates 420b, 420c, and 420d receive as their first inputs bits A0, C0, and D0 of the signals A, C, and D, respectively. The AND gates 420b, 420c, and 420d receive as their second inputs the outputs from NOR gates 400b, 400c, and 400d, respectively. The NOR gates 400b, 400c, and 400d receive as their first inputs the bit−B0. The NOR gates 400b, 400c, and 400d, receive as their second inputs the control signals −GTA, −GTC, and −GTD, which are the complements of the signals GTA, GTC, and GTC, respectively, in FIG. 4. The structure of the remaining six groups of the Source Select & Generate Term Generation circuit 250 is similar to that of the first group as just described above.

The outputs of the AND gates 420b, 420c, and 420d are dotted together as node 425 and applied to an inverter 440.

The node 425 is also inverted and applied to an OR gate 430. The outputs of the AND gates 421b, 421c, and 421d are dotted together as node 427. The node 427 is inverted before applied to the OR gate 430.

When the Source Select & Propagate Term Generation circuit 240 selects the signals A and B in FIG. 4, the Source Select & Generate Term Generation circuit 250 also selects the signals A and B as its first and second operands, respectively. More specifically, in group 0 of FIG. 5, because signal GTA is 1, −GTA is 0 and bit−B0 is passed through the NOR gate 406b to the AND gate 420b as bit B0. Because GTC and GTD are 0, −GTC and −GTD are 1. The outputs of the NOR gates 400c & 400d are both 0. As a result, the signals C0 and D0 are not passed to the dotted output node 425. Because the signal −B0 is from the register file 119 (FIG. 1), the signal −B0 is present at the NOR gate 400b early. The control signal −GTB is also available at the NOR gate 400b early. Therefore, before bit A0 comes to the AND gate 420b, bit B0 has arrived at the AND gate 420b. This makes the generation of the propagate and generate terms fast.

The output of the AND gate 420b holds a signal A0*B0. Because the outputs of the AND gates 420b, 420c, and 420d are dotted together and the node 425 is active-zero, the node 425 holds the signal −A0*B0. Because G0=A0*B0, the node 425 holds the signal −G0. Therefore, the output of the inverter 440 holds a signal G0 (a generate term). Similarly in group 1, because G1=A1*B1, the node 427 holds the signal −G1. Therefore, the output of the OR gate 430 holds a signal G0+G1. Because G01=G0+G1, the output of the OR gate 430 holds a signal G01 (a combined generate term).

In a similar manner, the signals G1, G2, G3, G4, G5, and G6 (generate terms) are generated. For simplicity, only the generation of the signal G0 is shown and described. Also, the signals G23 and G45 (combined generated terms) are generated, where Gij is defined as Gij=Gi+Gj. For simplicity, only the generation of signal G01 is shown and described. As a result, all the propagate terms including combined propagate terms of Equation 5 are available at the outputs of the Source Select & Propagate Term Generation circuit 240.

Some generate terms, such as G1, are not needed. Therefore, in one embodiment, only the generate terms present in Equation 5 are generated so as to simplify the circuitry of the Source Select & Generate Term Generation circuit 250.

For purposes of illustration, assume an address is to be generated by adding a first and second numbers wherein the first number is a result of the ALU 121 (FIG. 1) in a previous cycle and the second number is from the register file 119 (FIG. 1). The seven most significant bits of the nine least significant bits of the first number are forwarded as the signal A from the ALU 121 to the Source Select & Propagate Term Generation circuit 240 and the Source Select & Generate Term Generation circuit 250 (FIGS. 4 & 5). The seven most significant bits of the nine least significant bits of the second number come as the signal B directly from the register file 119 (FIG. 1) to the Source Select & Propagate Term Generation circuit 240 and the Source Select & Generate Term Generation circuit 250 (FIGS. 4 & 5). The Source Select & Propagate Term Generation circuit 240 and the Source Select & Generate Term Generation circuit 250 (FIGS. 4 & 5), in only one complex domino logic level, select the signals A and B as their first and second operands and generate the propagate and generate terms, including the combined propagate and generate terms, needed in Equation 5. Then, the Plus Carry Generation circuit 260 and Minus Carry Generation circuit 270 implement Equation 5 as a 4×4 AOI function to generate the plus carry and the minus carry (FIGS. 2 & 3).

The foregoing embodiments are merely illustrative and persons skilled in the art will readily recognize numerous other embodiments within the scope of the invention. For example, the assumption that the line access select address has nine bits is for illustration purposes only. The line access select address may have more or less than nine bits.

While the foregoing is directed to embodiments of the present invention, other and further embodiments of the invention may be devised without departing from the basic scope thereof, and the scope thereof is determined by the claims that follow.

What is claimed is:

1. A method for generating an effective address as a sum of a first and second numbers, the method comprising:

generating a first effective address based on an assumption there is a carry on a partial sum calculated from portions of the first and second numbers;

generating a second effective address based on an assumption there is no carry on the partial sum calculated from portions of the first and second numbers;

generating generate terms and propagate terms from the first and second numbers;

generating combined generate and propagate terms from the generate and propagate terms;

generating at least a first carry term from the generate terms, the propagate terms, and the combined terms, wherein the first carry term indicates whether or not there is a carry on the partial sum; and selecting one of the first and second addresses based on the value of the first carry term.

2. The method of claim 1, wherein:

the step of generating the carry term comprises generating the carry term from a limited subset of the generate terms, the propagate terms, and the combined generate terms.

3. The method of claim 2, wherein the step of generating combined generate terms from the generate terms comprises:

combining two of the generate terms to generate each of the combined generate terms.

4. The method of claim 3, wherein the step of generating at least the first carry term:

generating at least the first carry term as a function of less than all possible combined generate terms.

5. The method of claim 1, wherein:

the first carry term is generated prior to or concurrently with the first and second effective addresses.

6. The method of claim 5 wherein the step of generating combined propagate terms from the propagate terms comprises:

combining two of the propagate terms to generate each of the combined propagate terms.

7. The method of claim 6 wherein the step of generating at least the first carry term comprises:

generating at least the first carry term as a function of less than all possible combined propogate terms.

8. An address generation circuit for generating an effective address as a sum of a first and second numbers, comprising:

a plurality of inputs configured to receive the first and second numbers;

a fast carry generation circuit coupled to the inputs and configured to (a) generate propagate terms, generate terms, combined generate terms, and combined propagate terms from the first and second numbers, and (b) generate at least a first carry term from the propagate terms, the generate terms, the combined generate terms, and the combined propagate terms, wherein the first carry term indicates whether a partial sum of portions of the first and second numbers will generate a carry; and an address selection circuit configured to select between a first effective address generated based on an assumption the partial sum will generate a carry and a second effective address generated based on an assumption the partial sum will not generate a carry.

9. The address generation circuit of claim 8 wherein the fast carry generation circuit comprises:

a first circuit to generate the first carry term and a second circuit to generate a second carry term complementary to the first carry term.

10. The address generation circuit of claim 9 wherein the address selection circuit circuit comprises:

a first AND circuit controlled by the first carry term to select the first effective address and a second AND circuit controlled by the second carry term to select the second effective address.

11. A method for generating a look-ahead carry of a sum of a first and second N-bit numbers, the method comprising:

adding, with an adder, M most significant bits of the first and second numbers assuming a carry-in from a partial sum of portions of the first and second numbers to generate a first sum output, M being at least one but less than N;

adding M most significant bits of the first and second numbers assuming no carry-in from the partial sum to generate a second sum output;

generating a look-ahead carry term based on lower significant bits of the first and second numbers; and selecting one of the first and second sum outputs based on the value of the look-ahead carry term.

12. The method of claim 11 wherein the step of generating the look-ahead carry term comprises:

generating generate terms and propagate terms from portions of of the first and second numbers;

generating combined generate terms and combined propagate terms from the generate terms and the propagate terms, respectively; and generating the look-ahead carry term, from the generate terms, the propagate terms, the combined generate terms, and the combined propagate terms.

13. The method of claim 12 wherein the step of generating the look-ahead carry term comprises:

generating the look-ahead carry term prior to or concurrently with generating the first and second sum outputs.

14. The method of claim 13 wherein the step of generating the look-ahead carry term comprises:

generating a first look-ahead carry term and a second look-ahead carry term complementary to the first look-ahead carry term.

15. An adder circuit for generating a sum of a first and second N-bit numbers, comprising:

an addition circuit configured to receive M most significant bits of the first and second numbers and add the M most significant bits of the first and second numbers to generate, in parallel, a first sum assuming a carry-in resulting from a partial sum of a portion of the first and second numbers and a second sum assuming no carry-in resulting from the partial sum, M being at least one but less than N;

a fast carry generation circuit to generate at least a first carry term in conjunction with generating the first and second sums; and a selection circuit to select one of the first and second sums based on the at least a first carry term.

16. The adder circuit of claim 15 wherein the fast carry generation circuit is configured to:

generate terms and propagate terms from bits of the first and second numbers;

generate combined generate terms and combined propagate terms from the generate terms and the propagate terms, respectively; and generate the at least a first carry term from the generate terms, the propagate terms, the combined generate terms, and the combined propagate terms.

17. The adder circuit of claim 16 wherein the fast carry generation circuit is configured to generate the at least a first carry term based on a limited subset of the combined generate and propogate terms.

18. The adder circuit of claim 17 wherein:

the fast carry generation circuit is configured to generate the first carry term and a second term complementary to the first carry term; and the selection circuit comprises a first AND circuit configured to select the first sum based on the first carry term and a second AND circuit configured to select the second sum based on the second carry term.

* * * * *

UNITED STATES PATENT AND TRADEMARK OFFICE
CERTIFICATE OF CORRECTION

PATENT NO. : 6,868,489 B2
DATED : March 15, 2005
INVENTOR(S) : David Arnold Luick It is certified that error appears in the above-identified patent and that said Letters Patent is hereby corrected as shown below:

<u>Column 14,</u>
Line 7, "second term" should be -- second carry term --.

Signed and Sealed this

Fourteenth Day of June, 2005

JON W. DUDAS
*Director of the United States Patent and Trademark Office*